Figure 1:
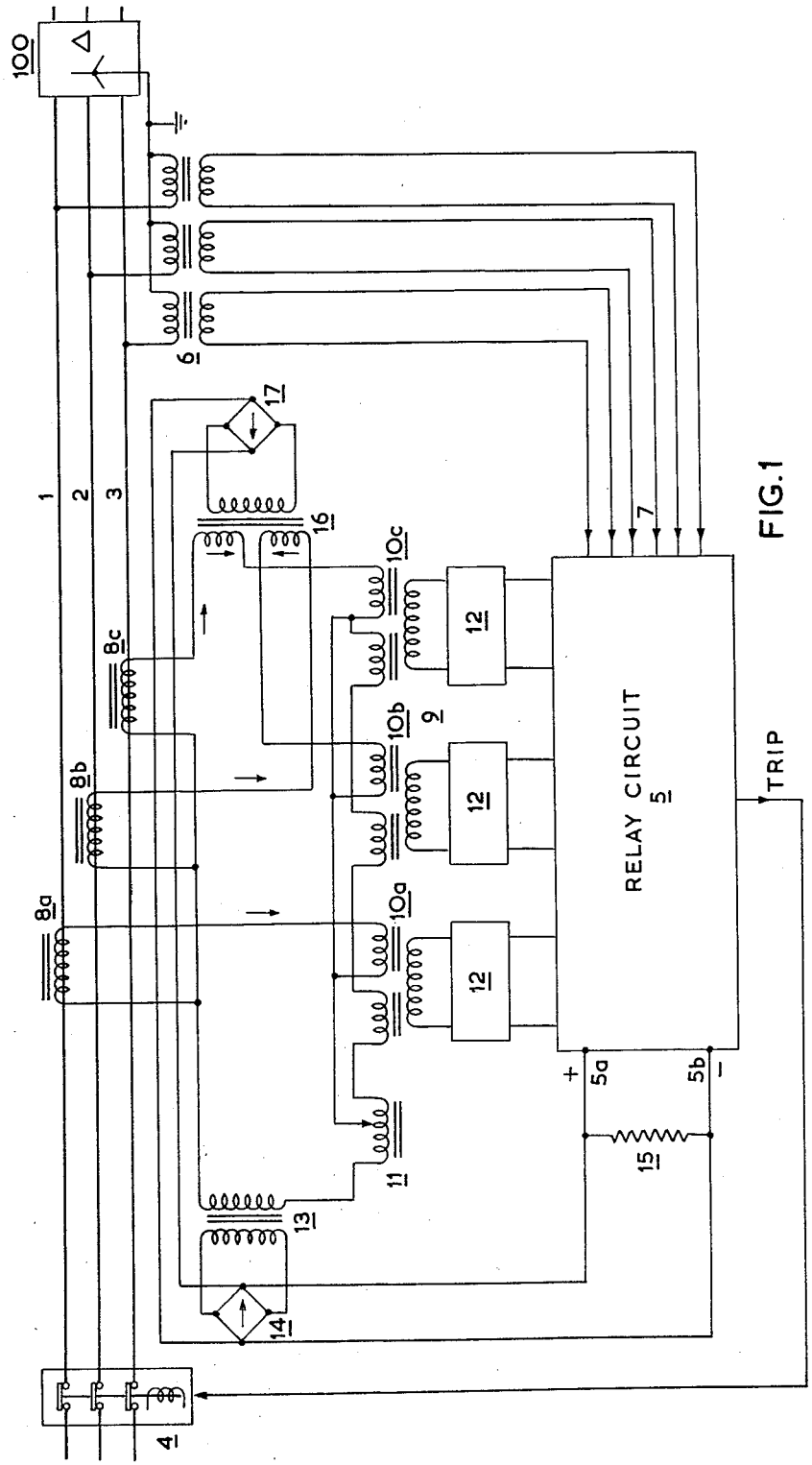

Aug. 7, 1962 A. R. VAN CORTLANDT WARRINGTON 3,048,745
POWER ENERGIZATION SUPPLY MEANS FOR ELECTRICAL
PROTECTIVE RELAY SYSTEMS
Filed Oct. 16, 1958 3 Sheets-Sheet 3

United States Patent Office 3,048,745
Patented Aug. 7, 1962

3,048,745
POWER ENERGIZATION SUPPLY MEANS FOR ELECTRICAL PROTECTIVE RELAY SYSTEMS
Albert Russell van Cortlandt Warrington, Stafford, England, assignor to The English Electric Company Limited, London, England, a British company
Filed Oct. 16, 1958, Ser. No. 767,608
Claims priority, application Great Britain Oct. 24, 1957
9 Claims. (Cl. 317—27)

This invention relates to power energization supply means for electrical protective relay systems.

The development of electrical protective relay systems having a minimum of moving parts involves the use of electronic or other electrical circuitry which requires an energization source such as a battery.

It is an object of this invention to provide a power energization means suitable for use in such a system which can replace or supplement a battery and to this end relates exclusively to relay systems having relays of the kind provided with an energizing power supply independent of the presence or absence of a relay operating signal. One such means previously proposed comprises a mixing transformer for use in a relay system which protects a three-phase circuit. The primary winding of this mixing transformer may have two intermediate tappings in addition to its end tappings and the four tappings may be connected to neutral and the first, second, and third phases of the protected circuit respectively. The energizing supply for the electronic or like equipment is derived by rectifying the output from the secondary winding on this transformer. One difficulty which arises in such an arrangement is that under certain special fault conditions in the protected circuit the mixing transformer becomes ineffective. For example, if a double-phased ground fault occurs with a grounded neutral and this fault is close to the point of connection of the transformer, the tappings on the transformer corresponding, say to the neutral, and first and third phases are effectively connected together and whatever be the voltage of the second phase the proportional currents between the second phase tapping and the first and third phase tappings respectively will be equal and will act in opposition to produce no induced E.M.F. in the secondary winding. Under these circumstances, the mixing transformer method can have a blind spot and such a means for providing the energizing power for the relay is therefore not 100 percent reliable.

It is an object of this invention to provide relay system energization means of improved reliability. One aspect of this invention provides simple reliable relay system energization means applicable to any relay system having a local ground connection, and other aspects of the invention provide a similar but more complex relay system energization means of more general application.

According to the first aspect of this invention, in an electrical protective relay system for a three-phase power circuit, apparatus for relay polarization or energization comprises, in combination, first circuit means connected to respond to the currents in two of the phases of the power circuit and produce an alternating signal proportional to the vector difference between these two currents, second circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals so that they aid one another in producing a polarizing or energizing signal for the relay.

According to the second aspect of this invention, in an electrical protective relay system for a three-phase power circuit, apparatus for relay polarization or energization comprises, in combination, first circuit means connected to respond to the currents in two of the phases of the power circuit and produce an alternating signal proportional to the vector difference between these two currents, second circuit means connected to respond to the currents in said two phases and produce an alternating signal proportional to the vector sum of these two currents, third circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals so that they aid one another in producing a polarizing or energizing signal for the relay.

According to the third aspect of this invention, in an electrical protective relay system for a three-phase power circuit, apparatus for relay polarization or energization comprises, in combination, first circuit means connected to respond to the current in one of the phases of the power circuit and produce an alternating voltage signal proportional to this current, second circuit means connected to respond to the current in another of the phases of the power circuit and produce an alternating voltage signal proportional to this current, third circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals so that they aid one another in producing a polarizing or energizing signal for the relay.

According to a feature of the invention, said apparatus further comprises voltage limiting means connected to limit the amplitude of the polarizing or energizing output signal before this is applied for relay polarization or energization.

According to a further feature of the invention, said voltage limiting means are connected to limit the amplitudes of the alternating signals individually before these signals are rectified and combined. This has the advantage of reducing the number of circuit components that are subjected to overload conditions.

According to a still further feature of the invention, where said voltage limiting means are connected to limit the signals individually before they are rectified, said further circuit means connected to combine the rectified signals comprise a parallel connection of the outputs of the rectifiers of said rectifier means, the positive output ends of the rectifiers being connected together to provide the combined positive output potential of the apparatus and the negative output ends of the rectifiers being connected together to provide the combined negative output potential of the apparatus, whereby the output voltage of the apparatus is limited to the maximum output voltage of one said rectifier.

According to one preferred feature of the invention, in an electrical protective relay system for a three phase power circuit having a local ground connection and including three current transformers connected to be energized individually by the currents of corresponding phases of the power circuit, apparatus for relay polarization or energization comprises, in combination, first saturating transformer means having two primary windings connected to two of said current transformers to be individually energized in response to the currents of the two corresponding phases of the power circuit and a secondary winding which produces an alternating signal having a limited mean magnitude subject to the existence of a sufficient vector difference between these two currents, second saturating transformer means having a primary winding connected to all three of said current transformers so as to be energized in response to the vector sum of the currents of all three phases of the power circuit and a secondary winding which produces an alternating signal having a limited mean magnitude subject to the existence of a sufficient vector sum of these currents, rectifier means responsive to said alternating signals for rectifying each of these signals independently, and further circuit means connected to combine these rectified signals by parallel addition to produce a polarizing or energizing signal for the relay.

According to another preferred feature of the invention, in an electrical protective relay system for a three phase power circuit not having a local ground connection but including three current transformers connected to be energized individually by the currents of corresponding phases of the power circuit, apparatus for relay polarization or energization comprises, in combination, first saturating transformer means having two primary windings connected to two of said current transformers to be individually energized in response to the currents of the two corresponding phases of the power circuit and a secondary winding which produces an alternating signal having a limited mean magnitude subject to the existence of sufficient vector difference between these two currents, second saturating transformer means having a primary winding energization circuit connected to the said two of the current transformers to be energized in response to the vector sum of the currents of the two corresponding phases of the power circuit and a secondary winding which produces an alternating signal having a limited means magnitude subject to the existence of a sufficient vector sum of these two currents, third saturating transformer means having a primary winding connected to all three of said current transformers so as to be energized in response to the vector sum of the currents of all three phases of the power circuit and a secondary winding which produces an alternating signal having a limited mean magnitude subject to the existence of a sufficient vector sum of these currents, rectifier means responsive to said alternating signals for rectifying each of these signals independently, and further circuit means connected to combine these rectified signals by parallel addition to produce a polarizing or energizing signal for the relay.

According to yet another preferred feature of the invention, in an electrical protective relay system for a three phase power circuit not having a local ground connection but including three current transformers connected to be energized individually by the currents of corresponding phases of the power circuit, apparatus for relay polarization or energization comprises, in combination, first saturating transformer means connected to a current transformer to respond to the current of one of said phases to produce an alternating signal having a limited mean magnitude subject to this current being of sufficient strength to saturate the transformer core of said first transformer means, second saturating transformer means connected to another current transformer to respond to the current of another of said phases to produce an alternating signal having a limited mean magnitude subject to this current being of sufficient strength to saturate the transformer core of said second transformer means, third saturating transformer means having two primary windings connected to the same two current transformers as the other saturating transformer means to be individually energized in response to the currents of the corresponding phases of the power circuit and a secondary winding which produces an alternating signal having a limited mean magnitude subject to the existence of a sufficient vector difference between these two currents, rectifier means responsive to said alternating signals for rectifying each of these signals independently, and further circuit means connected to combine these rectified signals by parallel addition to produce a polarizing or energizing signal for the relay.

Figure 2:
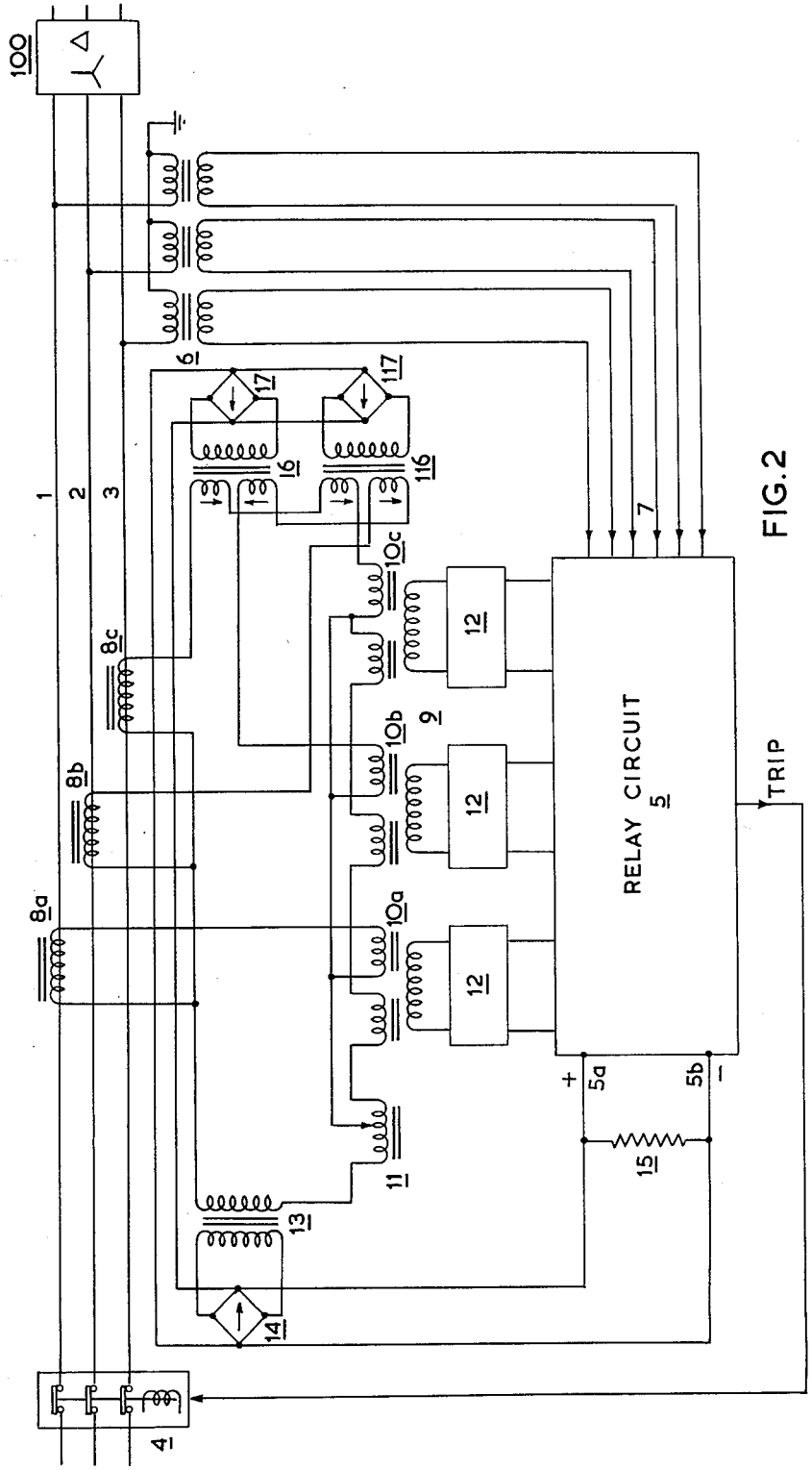
Figure 3:
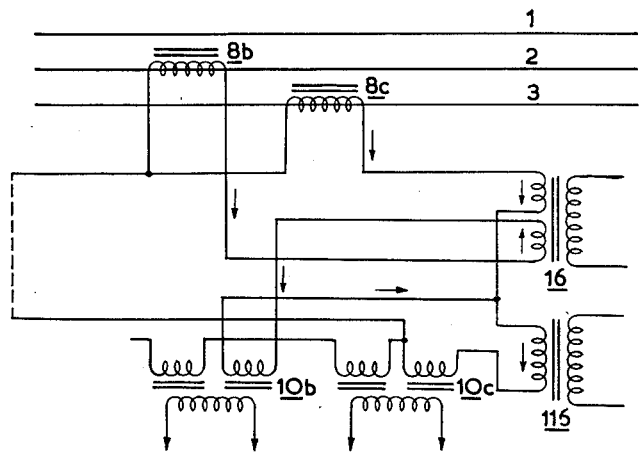
Figure 4:
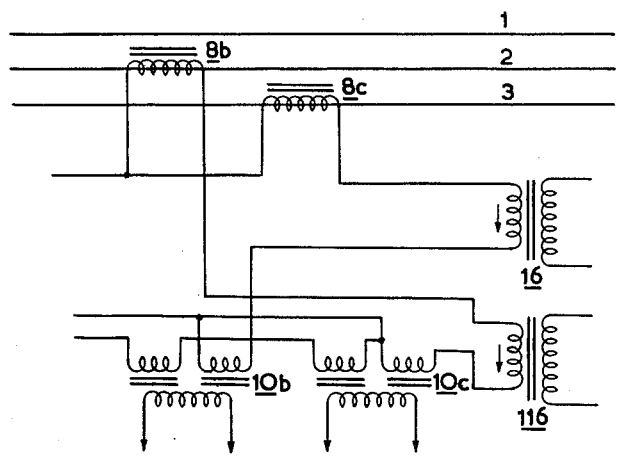

The invention will now be described with reference to the accompanying drawings in which are shown protective relay systems for use in the protection of a three phase power line. In these drawings:

FIG. 1 shows in detail a circuitry of an energization apparatus embodying the invention and suitable for use in a protective relay located near an end of the protected circuit which is grounded, FIG. 2 shows an alternative energization apparatus embodying the invention but of more general application, as exemplified in the drawing where this apparatus is used for the energization of a relay located to protect a power circuit which is either not grounded or is grounded by some remote connection, FIG. 3 shows a modified feature of the apparatus shown in FIG. 2, and FIG. 4 shows a further modified feature of the apparatus shown in FIG. 2.

Referring to FIG. 1, a three-phase power circuit is shown to comprise three phase lines 1, 2 and 3 respectively.

The power circuit is shown as a transmission line and the relay system embodying the invention is located at an end of this transmission line which is connected to a power transformer 100. This transformer has a ground connection which, is depicted schematically by an earth connection to the neutral point of a star winding. The power circuit includes an interrupter 4 which can be tripped automatically by known means in response to an output signal supplied by a relay circuit represented schematically at 5. It is supposed that this circuit 5 is of a kind which requires a standing energizing or polarizing voltage supply, for example one including vacuum tubes, transistors or the like; this supply is denoted by the positive and negative signs at the input terminals 5a and 5b respectively. The circuit 5 may, for example, include transistors which might require a 9-volt supply or other electronic devices which may involve an even greater supply voltage. Whereas the power required to trip the circuit interrupter 4 is derived through the relay circuit 5 from the terminals 5a and 5b the control of the tripping signal is determined by means within the circuit 5 in accordance with input signals derived from current and voltage transformers connected to be energized by the protected circuit. Thus signals representing the voltages of each of the lines 1, 2 and 3 are derived from voltage transformers at 6 and supplied to the relay circuit 5 along the leads shown generally at 7. The current signals are derived from current transformers 8a, 8b, 8c. These current transformers are connected to be energized by the currents in lines 1, 2 and 3 respectively. The output signals supplied by these transformers 8a, 8b, 8c are suitably combined to assist in the production of a special relay characteristic by the circuit 5 before being supplied to this circuit. The means for combining the current signals in this way involve the circuitry indicated generally at 9, and it is convenient in carrying this invention into effect to include the necessary apparatus for providing the voltage supply for the terminals 5a and 5b of the circuit 5 as part of the circuitry at 9.

The function of the circuitry at 9 is to derive voltage signals which are each proportional to a phase shifted version of a corresponding line current after a proportion of the zero sequence current of the protected circuit has been subtracted. The current to voltage signal conversion is effected by three transactors 10a, 10b and 10c. A transactor is a transformer having an air gap in its magnetic core whereby to render the transformation effect of the transformer one between a magnetising current and induced E.M.F., rather than one between two E.M.F.'s.

Each transactor has a primary winding which is energized directly by a current signal derived from a corresponding current transformer. Also, connected to act in opposition, each transactor has an auxiliary primary winding which forms part of a series-connected closed circuit which is inductively coupled by an auto transformer 11 to be energized in proportion to the vector sum of the current signals supplied by the transformers 8a, 8b, 8c. The outputs from the transactors are derived from their secondary windings and, after being subjected to suitable phase shifts by the phase shifting networks 12, these output signals are supplied directly to the relay circuit 5.

The operation of the circuitry at 9 is such that each transactor is energized by two opposed current signals one of which is equal to the current in the secondary winding of the corresponding current transformer 8a, 8b or 8c, and the other of which is proportional to the vector sum of the current transformer output currents. It is to be noted that this vector sum is proportional to the zero phase sequence current in the three-phase protected power circuit.

Included in series with the parallel connection of the secondary windings of the transformers 8a, 8b and 8c is the primary winding of a saturating transformer 13. This transformer is therefore energized in proportion to the zero phase sequence current in the protected circuit. Its secondary winding is connected through a full wave bridge rectifier 14 to supply a resistor 15 which is connected between the terminals 5a and 5b of a relay circuit 5. The transformer 13 acts, owing to its saturation characteristic, as a voltage limiting device and operates to supply the polarizing or energizing D.C. signal of the relay circuit 5 whenever sufficient zero sequence current is flowing in the protected circuit.

Combined with the voltage supplied from the transformer 13 is the output voltage supplied from a similar saturating transformer 16. This transformer has two primary windings one of which is connected to be energized by the current flowing through the secondary winding of the transformer 8c, and the other of which is connected in opposition to be energized by a current flowing in the secondary winding of the transformer 8b. Thus, the transformer 16 is energized in accordance with the vector difference between the currents in lines 2 and 3 of the protected circuit. A voltage limited output signal proportional to this vector difference is derived from the secondary winding of the transformer 16 and rectified by the full wave bridge rectifier 17 before being supplied to the load resistor 15.

In operation, the outputs from the two transformers 13 and 16 aid one another in providing the polarizing or energizing signal for the circuit 5. The outputs of the transformers 13 and 16 are combined in this way by a parallel connection of the outputs of the rectifiers 14 and 17. As shown in the drawing, the positive output ends of the bridge rectifiers 14 and 17 are connected together to provide the combined positive output potential of the relay energizing apparatus, and the negative output ends of these bridge rectifiers are similarly connected to provide the negative output of the apparatus. With such an arrangement the rectifiers aid one another by sharing between them the power supplied to the relay circuit 5. This mode of connection does not combine the output voltages of the rectifiers by addition but merely provides an output voltage according to which is the greater of the two outputs of the rectifiers. The advantage of this is that owning to the saturation of one or both of the transformers 13 and 16 under fault conditions the output voltage of the apparatus depends merely upon the existence of the fault condition.

With the arrangement shown in FIG. 1 the protected circuit is a length of transmission line extending beyond the interrupter 4 from the relay location. It is to be noted that in the event of a ground fault on the protected circuit a zero phase sequence current will flow in the protected circuit whereby an output from the transformer 13 is ensured. In the event of a phase-to-phase fault the vector difference between two currents, one in each phase, will never be zero in any practical situation and accordingly for such faults transformer 16 will ensure an output to energize the circuit 5. It is, however, to be noted that if there is no ground connection in the transformer 100 and the other end of the protected section of the transmission line has a local ground connection it is conceivable that a ground fault on line 1 of the protected circuit will draw all the zero phase sequence current through the ground connection at that end of the line with the result that the energization of the relay circuit under consideration, is reliant on the vector difference between the currents in the lines 2 and 3 on the non-grounded side of the fault. Under these circumstances, the vector difference between the currents in lines 2 and 3 can be zero at the same time as the local zero phase sequence current is zero. In such a case the energization apparatus of the relay could have a blind spot. However, this possibility does not arise in the arrangement shown in FIG. 1 because the relay energization system shown is used at the end of a protected section of a power line having a local ground connection.

The possible blind spot difficulty just mentioned, can be overcome by using relay energization apparatus of the kind shown in FIG. 2. Here, the transformer 100 at the end of the protected circuit adjacent the relay location does not have a ground connection, and the potential risk of a fault condition on the line with zero phase sequence current and a zero vector difference between two of the line currents arises.

The system shown in FIG. 2 reproduces the circuitry of FIG. 1, using similar numerals to denote similar circuit components, but includes the addition of a further saturating transformer denoted 116 and connected to supplement the energization signal provided by rectifiers 14 and 17 by means of an additional full wave bridge rectifier 117. The transformer 116, has two identical primary windings connected to be energized by the same line currents as the primary windings of transformer 16 but being connected to supplement one another in respect of their magnetic action so that whereas the output signal from the secondary winding of transformer 16 represents the vector difference between the two signals energizing the primary windings the output signal from the secondary winding of transformer 116 represents the vector sum of the two energizing signals. This vector sum signal is rectified by rectifier 117 and introduced into the enrgization supply of the relay circuit 5 as shown.

In operation, the presence of a zero phase sequence current component ensures relay circuit energization by virtue of the out-of-balance signal energization of transformer 13. In the absence of a zero phase sequence current component the vector difference between any two line phase currents can never be zero at the same time as their vector sum unless all the currents are zero. This latter condition is not a fault condition. Consequently, for a fault which does not produce an energizing output signal from transformer 13 there must be an output from either transformer 16 or transformer 116. The arrangement shown in FIG. 2 will not therefore have a blind spot and will provide reliable relay circuit energization for all fault conditions.

The arrangement shown in FIG. 2 is capable of modification to achieve a similar result as is indicated in FIGS. 3 and 4.

In FIG. 3 the local circuits of transformers 8b and 8c of FIG. 2 are shown to be modified so that transformer 116 has a single primary winding. This circuit is electrically equivalent to the circuit shown in FIG. 2 and its operation will be effectively the same.

In FIG. 4 a similar portion of FIG. 2 is shown to be modified so that instead of transformers 16 and 116 each having two primary windings they have only one energized from a corresponding current transformer 8b or 8c. With this circuit arrangement the output signals from the saturating transformer 16 and 116 are simply related to the currents of the corresponding two phases respectively. It is evident that in the absence of a zero phase sequence current component one of these two currents must be of appreciable strength under fault conditions.

In the arrangement shown in FIGS. 1 and 2 the connection of the voltage limiting devices (the saturating transformers) in the circuit to limit the energization signals before these signals are rectified ensures that the rectifiers are not subjected to overload conditions. However, it falls within the scope of this invention for the voltage limiting devices to be connected in circuit after the rectifiers. In this way a D.C. voltage limiting device may be connected across the terminals 5a and 5b, but in such a case the rectifiers 14 and 17 will become subject to the full overload conditions of the circuit. Also, in this case there is no advantage in combining the outputs from the rectifiers 14, 17 and 117 in paralell as shown. These outputs may equally well be connected to add in series because the D.C. voltage limiting device will be fully effective in rendering the energization output voltage of the apparatus independent of the nature of the fault condition, that is independent of whether the fault causes one, two or three of the rectifiers 14, 17 and 117 to be heavily loaded.

In the foregoing description it has been supposed that the outputs from the saturating transformers are of comparable magnitude, phase relationships being ignored. It is therefore to be understood that an inherent smoothing function is required of each saturating transformer secondary winding and to this end it should be designed to have a high self inductance.

What I claim as my invention and desire to secure by Letters Patent is:

1. In combination, in an electrical protective relay system for a three-phase power circuit having a local ground connection, a relay of the kind having an energizing power supply independent of a relay operating signal, a circuit network connected to be eenrgized by said power circuit and operative to derive and supply to the relay said relay operating signal, and apparatus for relay energization comprising first circuit means connected to respond to the currents in two of the phases of the power circuit and produce an alternating signal proportional to the vector difference between these two currents, second circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals to produce an energizing signal for the relay.

2. In combination, in an electrical protective relay system for a three-phase power circuit, a relay of the kind having an energizing power supply independent of a relay operating signal, a circuit network connected to be energized by said power circuit and operative to derive and supply to the relay said relay operating signal, and apparatus for relay energization comprising first circuit means connected to respond to the currents in two of the phases of the power circuit and produce an alternating signal proportional to the vector difference between these two currents, second circuit means connected to respond to the currents in said two phases and produce an alternating signal proportional to the vector sum of these two currents, third circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals to produce an energizing signal for the relay.

3. In combination, in an electrical protective relay system for a three-phase power circuit, a relay of the kind having an energizing power supply independent of a relay operating signal, a circuit network connected to be energized by said power circuit and operative to derive and supply to the relay said relay operating signal, and apparatus for relay energization comprising first circuit means connected to respond to the current in one of the phases of the power circuit and produce an alternating voltage signal proportional to this current, second circuit means connected to respond to the current in another of the phases of the power circuit and produce an alternating voltage signal proportional to this current, third circuit means connected to respond to the currents in all three of the phases of the power circuit and produce an alternating signal proportional to the vector sum of these three currents, rectifier means responsive to said alternating signals for rectifying each of these signals independently, and further circuit means connected to combine these rectified signals to produce an energizing signal for the relay.

4. The invention according to claim 9, wherein said voltage limiting means are connected to limit the amplitudes of the alternating signals individually before these signals are rectified and combined.

5. The invention according to claim 4, wherein said voltage limiting means are connected to limit the signals individually before they are rectified, and wherein said further circuit means connected to combine the rectified signals comprise a parallel connection of the outputs of the rectifiers of said rectifier means, the positive output ends of the rectifiers being connected together to provide the combined positive output potential of the apparatus and the negative output ends of the rectifiers being connected together to provide the combined negative output potential of the apparatus, whereby the output voltage of the apparatus is limited to the maximum output voltage of one said rectifier.

6. In combination, in an electrical protective relay system for a three-phase power circuit, a relay of the kind having an energizing power supply independent of a relay operating signal, a circuit network connected to be energized by said power circuit and operative to derive and supply to the relay said relay operating signal, and apparatus for relay energization comprising a current transformer in each phase of said power circuit, first saturating transformer means having two primary windings connected to two of said current transformers to be individually energized in response to the currents of the two corresponding phases of the power circuit and a secondary winding which produces an alternating signal having a limited mean amplitude subject to the existence of a sufficient vector difference between these two currents, second saturating transformer means having a primary winding connected to all three of said current transformers so as to be energized in response to the vector sum of the currents of all three phases of the power circuit and a secondary winding which produces an alternating signal having a limited mean magnitude subject to the existence of a sufficient vector sum of these currents, rectifier means responsive to said alternating signals for rectifying each of these signals independently, and further circuit means connected to combine these rectified signals by parallel addition to produce an energizing signal for the relay.

7. In combination, in an electrical protective relay system for a three-phase power circuit, a relay of the kind having an energizing power supply independent of a relay operating signal, a circuit network connected to be energized by said power circuit and operative to derive and supply to the relay said relay operating signal, and apparatus for relay energization comprising a current transformer in each phase of said power circuit first saturating transformer means having two primary windings connected to two of said current transformers to be individually energized in response to the currents of the two corresponding phases of the power circuit and a secondary winding which produces an alternating signal having a limited mean magnitude subject to the existence of sufficient vector difference between these two currents, second saturating transformer means having a primary winding energization circuit connected to the said two of the current transformers to be energized in response to the vector sum of the currents of the two corresponding phases of the power circuit and a secondary winding which produces an alternating signal having a limit mean manitude subject to the existence of a sufficient vector sum of these two currents, third saturating transformer means having a primary winding connected to all three of said current transformers so as to be energized in response to the vector sum of the currents of all three phases of the power circuit and a secondary winding which produces an alternating signal having a limited mean magnitude subject to the existence of a sufficient vector sum of these currents, rectifier means responsive to said alternating signals for rectifying each of these signals independently, and further circuit means connected to combine these rectified signals by parallel addition to produce an energizing signal for the relay.

8. In combination, in an electrical protective relay system for a three-phase power circuit, a relay of the kind having an energizing power supply independent of a relay operating signal, a circuit network connected to be energized by said power circuit and operative to derive and supply to the relay said relay operating signal, and apparatus for relay energization comprising first saturating transformer means connected to a current transformer to respond to the current of one of said phases to produce an alternating signal having a limited mean magnitude subject to this current being of sufficient strength to saturate the transformer core of said first transformer means, second saturating transformer means connected to another current transformer to respond to the current of another of said phases to produce an alternating signal having a limited mean magnitude subject to this current being of sufficient strength to saturate the transformer core of said second transformer means, third saturating transformer means having two primary windings connected to the same two current transformers as the other saturating transformer means to be individually energized in response to the currents of the corresponding phases of the power circuit and a secondary winding which produces an alternating signal having a limited mean magnitude subject to the existence of a sufficient vector difference between these two currents, rectifier means responsive to said alternating signals for rectifying each of these signals independently, and further circuit means connected to combine these rectified signals by parallel addition to produce an energizing signal for the relay.

9. In combination, in an electrical protective relay system for a three-phase power circuit, a relay of the kind having an energizing power supply independent of the presence or absence of a relay operating signal, a circuit network connected to be energized by said power circuit and operative to derive and supply to the relay said relay operating signal, and apparatus for relay energization comprising a plurality of circuit means connected to respond to the current energization of said power circuit to derive different individual alternating signals which are not simultaneously zero for any condition of current energization of the power circuit, rectifier means responsive to said alternating signals for rectifying each of these signals independently, further circuit means connected to combine these rectified signals to produce an energizing signal for the relay, and voltage limiting means connected to limit the amplitude of the relay energizing signal before this is applied to energize the relay.

References Cited in the file of this patent
UNITED STATES PATENTS

| | | |
|---|---|---|
| 2,242,950 | Harder | May 20, 1941 |
| 2,735,962 | Ellis et al. | Feb. 21, 1956 |